US009850134B2

(12) United States Patent
Huang et al.

(10) Patent No.: US 9,850,134 B2
(45) Date of Patent: Dec. 26, 2017

(54) GRAPHENE FLOWER AND METHOD FOR MANUFACTURING THE SAME AND COMPOSITE MATERIAL

(71) Applicant: INDUSTRIAL TECHNOLOGY RESEARCH INSTITUTE, Hsinchu (TW)

(72) Inventors: Kun-Ping Huang, Nanzhuang Township (TW); Chih-Chen Chang, New Taipei (TW); Chwung-Shan Kou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 234 days.

(21) Appl. No.: 14/851,923

(22) Filed: Sep. 11, 2015

(65) Prior Publication Data
US 2017/0022064 A1  Jan. 26, 2017

(30) Foreign Application Priority Data

Jul. 21, 2015 (TW) .............................. 104123515 A

(51) Int. Cl.
*C01B 31/04*  (2006.01)
*C01B 32/182*  (2017.01)
*C01B 32/184*  (2017.01)

(52) U.S. Cl.
CPC ........ *C01B 31/0446* (2013.01); *C01B 32/182* (2017.08); *C01B 32/184* (2017.08)

(58) Field of Classification Search
CPC .................. C01B 31/0446; C01B 31/0438
USPC ....................................................... 428/402
See application file for complete search history.

(56) References Cited

U.S. PATENT DOCUMENTS

| | | | |
|---|---|---|---|
| 8,575,665 B2 | 11/2013 | Heo et al. | |
| 8,638,614 B2 | 1/2014 | Cho et al. | |
| 8,664,642 B1 | 3/2014 | Davis | |
| 8,816,257 B2 | 8/2014 | Kim et al. | |
| 8,828,523 B2 | 9/2014 | Moon et al. | |
| 8,853,061 B1 | 10/2014 | Davis | |
| 8,859,044 B2* | 10/2014 | Huang ................ | C01B 31/0453 427/249.1 |
| 8,884,345 B2 | 11/2014 | Heo et al. | |
| 8,916,013 B2 | 12/2014 | Hong et al. | |
| 8,916,057 B2 | 12/2014 | Hong et al. | |
| 8,916,850 B2 | 12/2014 | Yi et al. | |
| 8,926,854 B2 | 1/2015 | Hong et al. | |
| 2002/0050323 A1* | 5/2002 | Moisan ................. | B01D 53/32 156/345.41 |
| 2012/0168721 A1* | 7/2012 | Kelber ............... | H01L 21/02381 257/29 |
| 2013/0130011 A1 | 5/2013 | Hong et al. | |
| 2013/0187097 A1 | 7/2013 | Hong et al. | |
| 2014/0170057 A1* | 6/2014 | Huang .................. | B82Y 30/00 423/448 |
| 2014/0326600 A1 | 11/2014 | Li et al. | |
| 2015/0056758 A1 | 2/2015 | Heo et al. | |

FOREIGN PATENT DOCUMENTS

| | | |
|---|---|---|
| CN | 101233266 A | 7/2008 |
| CN | 102329976 A | 1/2012 |
| CN | 102592841 A | 7/2012 |
| CN | 102738237 A | 10/2012 |
| CN | 103193220 A | 7/2013 |
| CN | 103345963 A | 10/2013 |
| CN | 103804661 A | 5/2014 |
| CN | 103864061 A | 6/2014 |
| CN | 104218443 A | 12/2014 |
| CN | 204424269 U | 6/2015 |
| TW | 201300318 A1 | 1/2013 |
| TW | 201336784 A | 9/2013 |
| TW | 201406653 A | 2/2014 |
| TW | 201422525 A | 6/2014 |
| TW | 201510211 A | 3/2015 |
| TW | 201515994 A | 5/2015 |

OTHER PUBLICATIONS

Tian, et al., "Synthesis of nanostructured carbons by the microwave plasma cracking of methane", Carbon 2013; 51:243-248.*
Taiwanese Office Action and Search Report, dated Mar. 1, 2016, for corresponding Taiwanese Application No. 104123515.
Taiwanese Office Action and Search Report, dated Aug. 30, 2016, for Taiwanese Application No. 105111315.
Guo et al., "Electrochemical performance of graphene nanosheets as anode material for lithium-ion batteries", Electrochemistry Communications, vol. 11, 2009, pp. 1320-1324.
Hojati-Talemi et al., "Preparation of graphene nanowalls by a simple microwave-based method", Carbon, vol. 48, 2010, pp. 3993-4000.
Lin et al., "Nitrogen-Doped Graphene/Platinum Counter Electrodes for Dye-Sensitized Solar Cells", ACS Photonics, vol. 1, 2014, pp. 1264-1269.
Wang et al., "Synthesis of carbon nanosheets by inductively coupled radio-frequency plasma enhanced chemical vapor deposition", Carbon, vol. 42, 2004, pp. 2867-2872.

(Continued)

Primary Examiner — Leszek Kiliman
(74) Attorney, Agent, or Firm — Birch, Stewart, Kolasch & Birch, LLP

(57) ABSTRACT

A method of forming graphene flower is provided, which includes introducing a hydrocarbon gas and an assistance gas into transformer-coupled plasma equipment, and providing a medium-frequency electromagnetic wave to the hydrocarbon gas and the assistance gas by the transformer-coupled plasma equipment to dissociate the hydrocarbon gas, and the dissociated hydrocarbon gas is re-combined to form the graphene flower, wherein the hydrocarbon gas is dissociated at a ratio of greater than 95%.

21 Claims, 2 Drawing Sheets

(56) References Cited

OTHER PUBLICATIONS

Wróbel et al., "Oligomerization and Polymerization Steps in Remote Plasma Chemical Vapor Deposition of Silicon-Carbon and Silica Films from Organosilicon Sources", Chem. Mater., vol. 13, 2001, pp. 1884-1895.

Wróbel et al., "Remote Hydrogen Plasma Chemical Vapor Deposition of Amorphous Hydrogenated Silicon-Carbon Films from an Organosilane Molecular Cluster as a Novel Single-Source Precursor: Structure, Growth Growth Mechanism, and Properties of the Deposit", Chem. Mater., vol. 7, 1995, pp. 1403-1413.

* cited by examiner

GRAPHENE FLOWER AND METHOD FOR MANUFACTURING THE SAME AND COMPOSITE MATERIAL

CROSS REFERENCE TO RELATED APPLICATIONS

The present application is based on, and claims priority from, Taiwan Application Serial Number 104123515, filed on Jul. 21, 2015, the disclosure of which is hereby incorporated by reference herein in its entirety.

TECHNICAL FIELD

The technical field relates to graphene flower, and in particular it relates to the manufacture and application of the graphene flower.

BACKGROUND

Graphene has excellent heat-dissipation properties, high electrical conductivity, high mechanical strength, and the like. As such, graphene can be utilized in a heat dissipation glue, a thermal conductive glue, or an extremely strengthen composite material. Using conventional chemical methods, the graphite bulk is dissembled to few-layer graphene of low yield by a large amount of chemicals at a high temperature. Electrolysis can be used to prepare the few-layer graphene, but it takes a long time and simultaneously damages the graphene. In short, electrolysis cannot rapidly prepare the graphene in mass production. On the other hand, most of the graphene formed by conventional processes has a plate appearance, which cannot be directly mixed with other materials to form a composite.

Accordingly, graphene of a novel appearance manufactured by a novel process is called-for.

SUMMARY

One embodiment of the disclosure provides a method of forming graphene flower, comprising: introducing a hydrocarbon gas and an assistance gas into transformer-coupled plasma equipment; and providing a medium-frequency electromagnetic wave to the hydrocarbon gas and the assistance gas by the transformer-coupled plasma equipment to dissociate the hydrocarbon gas, and the dissociated hydrocarbon gas is re-combined to form the graphene flower, wherein the hydrocarbon gas is dissociated at a ratio of greater than 95%.

One embodiment of the disclosure provides a graphene flower, comprising: a plurality of graphene sheets arranged in a non-parallel manner and tangled with each other, wherein the graphene flower has a profile free of a planar surface.

One embodiment of the disclosure provides a composite material, comprising: 100 parts by weight of metal powder; and 0.5 to 50 parts by weight of graphene flower, wherein the graphene flower includes a plurality of graphene sheets arranged in a non-parallel manner and tangled with each other, and wherein the graphene flower has a profile free of a planar surface.

One embodiment of the disclosure provides a composite material, comprising: 100 parts by weight of polymer powder or liquid; and 0.5 to 50 parts by weight of graphene flower, wherein the graphene flower includes a plurality of graphene sheets arranged in a non-parallel manner and tangled with each other, and wherein the graphene flower has a profile free of a planar surface.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
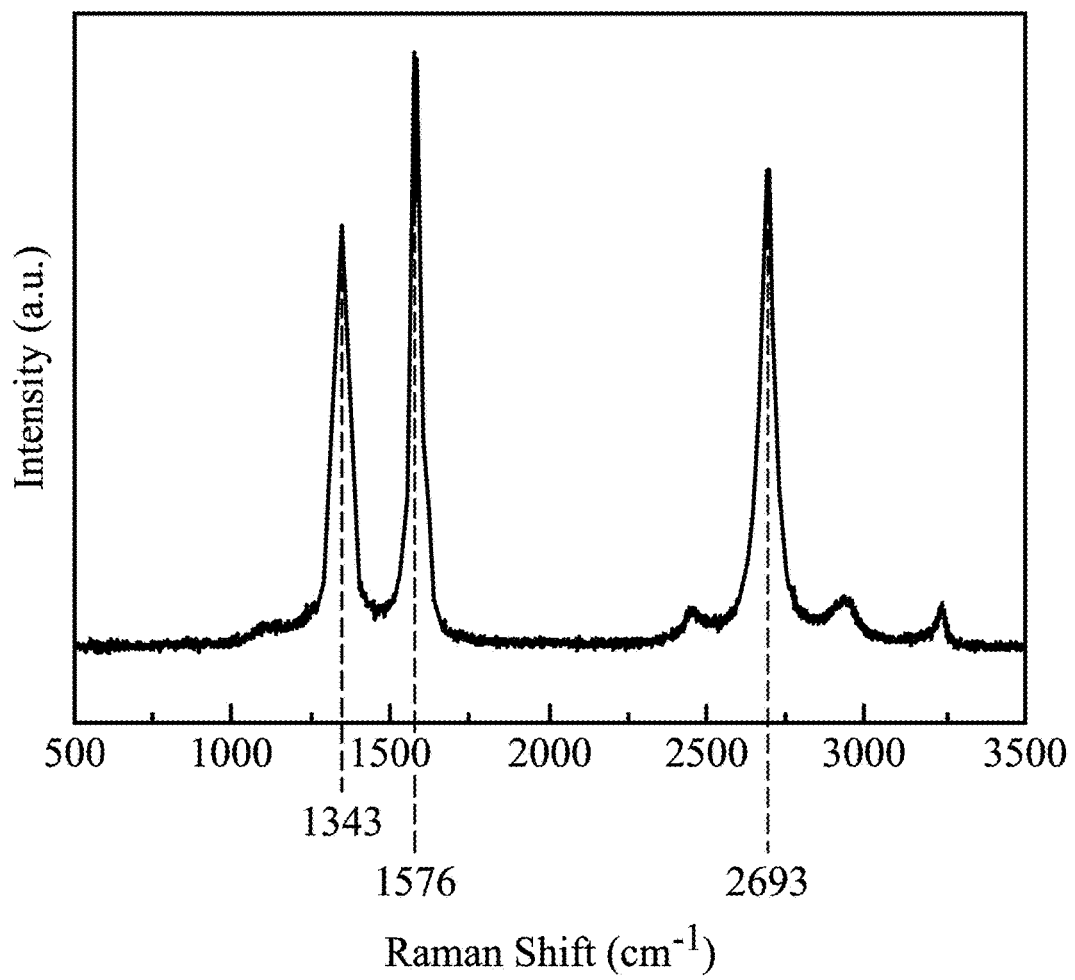
FIG. 1 shows a Raman spectrum of graphene flower in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment provides a method of forming graphene flower, including introducing a hydrocarbon gas and an assistance gas into transformer-coupled plasma equipment. In conventional skills, the reactants such as introduced gas and an upper layered material of a substrate will be dissociated at a high rate by the transformer-coupled plasma equipment. In general, the transformer-coupled plasma equipment is usually utilized in clean or dry etching processes. In the disclosure, the transformer-coupled plasma equipment is used to form (not destruct) a product of specific appearance such as graphene flower, it is obviously beyond the reasonable expectations for one skilled in the art about the transformer-coupled plasma equipment.

In one embodiment, the hydrocarbon gas introduced into the transformer-coupled plasma equipment can be methane, ethylene, acetylene, or a combination thereof, and the assistance gas includes argon, helium, nitrogen, or a combination thereof. In one embodiment, the hydrocarbon gas is methane. The hydrocarbon gas and the assistance gas in the transformer-coupled plasma equipment have a total pressure of 0.1 torr to 20 torr during manufacture of the graphene flower. An overly high total pressure cannot be easily matched to ignite the plasma. An overly low total pressure cannot efficiently produce the graphene flower in mass production. The molar ratio of the hydrocarbon gas and the assistance gas depends on the flow rate ratio thereof. In one embodiment, the hydrocarbon gas is introduced at a flow rate of 0.1 slm to 20 slm, and the assistance gas is introduced at a flow rate of 1 slm to 50 slm. In one embodiment, the hydrocarbon gas and the assistance gas have a molar ratio of 1:20 to 1:2. The hydrocarbon gas with an overly low flow rate and the assistance gas with an overly high flow rate (e.g. an overly low molar ratio of the hydrocarbon gas) cannot efficiently produce the graphene flower in mass production. The hydrocarbon gas with an overly high flow rate and the assistance gas with an overly low flow rate (e.g. an overly high molar ratio of the hydrocarbon gas) cannot ignite the plasma.

Subsequently, a medium-frequency electromagnetic wave is provided to the hydrocarbon gas and the assistance gas by the transformer-coupled plasma equipment to dissociate the hydrocarbon gas, and the dissociated hydrocarbon gas is re-combined to form the graphene flower. The transformer-coupled plasma equipment may greatly enhance the current density of the induction coil according to Lenz's law, thereby achieving a high dissociation rate. For example, over 95% of the hydrocarbon gas can be dissociated by the transformer-coupled plasma equipment. In one embodiment, the medium-frequency electromagnetic wave has a frequency of 100 kHz to 3 MHz. The medium-frequency electromagnetic wave with an overly low frequency is inefficient, and the medium-frequency electromagnetic wave with an overly high frequency results in an overly high cost of manufacturing the transformer-coupled plasma source. In one embodiment, an electromagnetic wave with a frequency of 400 kHz (commercial standard) is selected. In one embodiment, the medium-frequency electromagnetic wave is provided with a power that is greater than 1 kW, such as between 1 kW to 50 kW. An overly low power results in a production yield that is too low to achieve cost-effectiveness. An overly high power cannot stably control the plasma. Note that the above process does not include any additional support such as a substrate, and the graphene flower can be formed directly in a chamber of the transformer-coupled plasma equipment.

In one embodiment, the transformer-coupled plasma equipment is connected to one end of a collector, and another end of the collector is connected to a pump. The pump may draw the graphene flower from the transformer-coupled plasma equipment to the collector. The collector includes filters and the like to collect the graphene flower. Alternatively, a common dust collector such as a vacuum cleaner can be used to collect the graphene flower.

The graphene flower manufactured through the above processes includes a plurality of graphene sheets arranged in a non-parallel manner and tangled with each other. In conventional skills of forming the graphene, the graphene is usually deposited on a substrate. Therefore, the graphene has a profile with a planar surface that corresponds to the substrate surface. Because the graphene flower in one embodiment is formed in the chamber (without any substrate) of the transformer-coupled plasma equipment, the graphene flower has a profile free of a planar surface. The profile of the surface of the graphene flower is irregular, and the graphene flower has a diameter of 10 nm to 5 mm. In one embodiment, the graphene flower is composed of graphene sheets with a curved structure or an irregular wrinkle structure. In one embodiment, the graphene flower is composed of graphene sheets having 3 to 10 layers, which can be determined by a 2D/G peak ratio of the Raman spectrum of the graphene flower.

The graphene formed by conventional processes cannot be directly mixed with metal powder, even if the graphene is mechanically milled to a powder. If the milled graphene is mixed with a metal powder, the mixture will quickly separate into layers, such as an upper layer of the milled graphene and a lower layer of the metal powder. The graphene powder is usually modified or oxidized to be uniformly mixed with other materials, but it increases the manufacturing cost as well as the possibility of degrading the properties of the graphene and the composite material.

The graphene flower prepared by the examples of the disclosure can be directly mixed with a metal powder such as aluminum powder. In one embodiment, 100 parts by weight of the metal powder can be mixed with 0.5 to 50 parts by weight of the graphene flower to form a composite material. An overly low amount of the graphene flower cannot improve the properties of the composite material. An overly high amount of the graphene flower will reduce the strength of the composite material. In one embodiment, the metal powder can be lithium, sodium, aluminum, iron, copper, silver, nickel, cobalt, ruthenium, rhodium, palladium, platinum, the like, an alloy thereof, or a combination thereof. The metal powder may have a diameter of 5 nm to 50 μm to achieve the required density and meet the cost requirements. The metal powder with an overly large diameter cannot be densely sintered, thereby negatively influencing the thermal conductivity. The metal powder with an overly small diameter is expensive and does not provide a better effect. Compared to a pure metal powder, the composite material has a largely increased thermal conductivity.

The graphene flower prepared by the examples of the disclosure can be directly mixed with polymer powder or liquid. In one embodiment, 100 parts by weight of the polymer powder or liquid can be mixed with 0.5 to 50 parts by weight of the graphene flower to form a composite material. An overly low amount of the graphene flower cannot improve the properties of the composite material. An overly high amount of the graphene flower will reduce the strength of the composite material. In one embodiment, the polymer powder or liquid can be polyethylene, polyvinylchloride, polypropylene, silicone, toluene, PU glue, or ethyl acetate (EA). The polymer powder may have a diameter of 10 nm to 50 μm to achieve economical requirement and dense effect. The polymer powder with an overly large diameter cannot be uniformly mixed. The polymer powder with an overly small diameter is expensive. Compared to a pure polymer powder or liquid, the composite material has a largely increased thermal conductivity.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Figure 2:
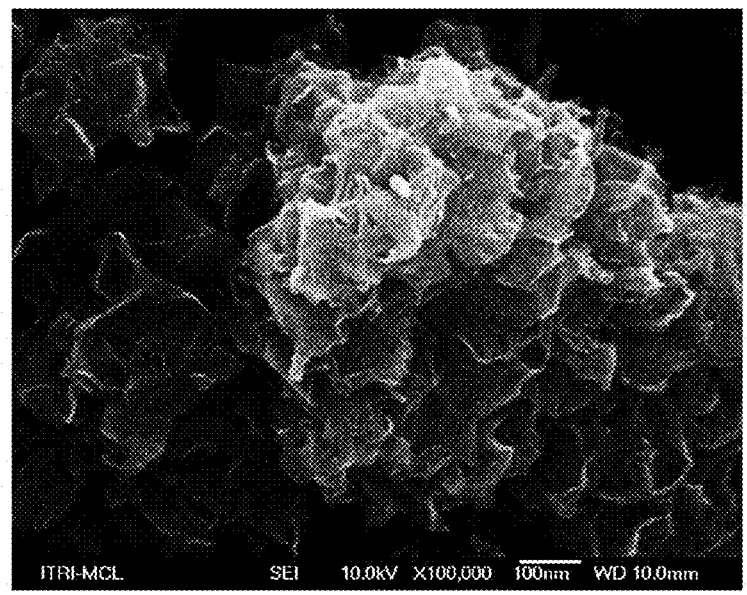
FIG. 2 shows an SEM image of graphene flower in one embodiment of the disclosure.

Methane with a flow rate of 0.7 slm and argon with a flow rate of 3 slm were introduced into transformer-coupled plasma equipment ASTRON® PARAGON AX7700 (commercially available from MKS). The working pressure of the methane and argon in the transformer-coupled plasma equipment was 8 torr. A voltage of 210V (with a power of 6000 W and a frequency of 400 kHz) was applied to the gas of methane and argon, such that the methane was dissociated at a ratio of greater than 95% and re-combined to form graphene flower (with a capacity of greater than 10 g/hr and a yield of greater than 45%). The Raman spectrum of the graphene flower is shown in FIG. 1. The 2D/G peak ratio in the Raman spectrum is about 3/4, which means that each of the graphene sheets in the graphene flower had about 3 to 4 layers. The SEM image of the graphene flower is shown in FIG. 2, in which the graphene sheets are arranged in a non-parallel manner and tangled with each other. In addition, the graphene sheets had a curved structure or an irregular wrinkle structure.

Example 2

Aluminum powder (with a diameter of 20 μm) was pressed to a bulk of 3 mm×30 mm×30 mm by powder metallurgy, and then analyzed by a thermal conductivity analyzer (Hot Disk) to detect its heat dissipation coefficient (23.9 W/mK).

1 part by weight of the graphene flower in Example 1 and 100 parts by weight of the aluminum powder (with a diameter of 20 μm) were mixed and pressed to a bulk of 3 mm×30 mm×30 mm by powder metallurgy, and then analyzed by the thermal conductivity analyzer (Hot Disk) to detect its heat dissipation coefficient (33.7 W/mK). Compared to the pure aluminum bulk, the heat dissipation coefficient of the composite including the graphene flower was enhanced 41%.

Example 3

The commercially available heat dissipation glue Arctic MX-4 was analyzed by the thermal conductivity analyzer (Hot Disk) to detect its heat dissipation coefficient (3 W/mK).

0.5 parts by weight of the graphene flower in Example 1 and 100 parts by weight of the heat dissipation glue Arctic MX-4 were mixed, and then analyzed by the thermal conductivity analyzer (Hot Disk) to detect its heat dissipation coefficient (6.5 W/mK). Compared to the pure heat dissipation glue, the heat dissipation coefficient of the composite including the graphene flower was enhanced 117%.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method of forming a graphene flower, comprising:
   introducing a hydrocarbon gas and an assistance gas into a transformer-coupled plasma equipment; and
   providing a medium-frequency electromagnetic wave to the hydrocarbon gas and the assistance gas by the transformer coupled plasma equipment to dissociate the hydrocarbon gas, and the dissociated hydrocarbon gas is re-combined to form the graphene flower,
   wherein the hydrocarbon gas is dissociated at a ratio of greater than 95%,
   wherein the medium frequency electromagnetic wave has a frequency of 100 kHz to 3 MHz.

2. The method as claimed in claim 1, wherein the hydrocarbon gas is introduced at a flow rate of 0.05 slm to 25 slm.

3. The method as claimed in claim 1, wherein the assistance gas is introduced at a flow rate of 1 slm to 50 slm.

4. The method as claimed in claim 1, wherein a flow rate of the hydrocarbon gas and a flow rate of the assistance gas have a ratio of 1:20 to 1:2.

5. The method as claimed in claim 1, wherein the hydrocarbon gas comprises methane, ethylene, acetylene, or a combination thereof.

6. The method as claimed in claim 1, wherein the assistance gas comprises argon, helium, nitrogen, or a combination thereof.

7. The method as claimed in claim 1, wherein the hydrocarbon gas and the assistance gas in the transformer-coupled plasma equipment have a pressure of 0.1 torr to 20 torr.

8. The method as claimed in claim 1, wherein the step of providing the medium-frequency electromagnetic wave is performed with a power that is greater than 1 kW.

9. A graphene flower, comprising:
   a plurality of graphene sheets arranged in a non-parallel manner and tangled with each other,
   wherein the graphene flower has a profile free of a planar surface.

10. The graphene flower as claimed in claim 9, having a diameter of 10 nm to 5 mm.

11. The graphene flower as claimed in claim 9, wherein the graphene sheets have a curved structure or an irregular wrinkle structure.

12. A composite material, comprising:
    100 parts by weight of metal powder; and
    0.5 to 50 parts by weight of graphene flower,
    wherein the graphene flower includes a plurality of graphene sheets arranged in a non-parallel manner and tangled with each other, and
    wherein the graphene flower has a profile free of a planar surface.

13. The composite material as claimed in claim 12, wherein the metal powder has a diameter of 5 nm to 50 μm.

14. The composite material as claimed in claim 12, wherein the graphene flower has a diameter of 10 nm to 50 μm.

15. The composite material as claimed in claim 12, wherein the graphene sheets have a curved structure or an irregular wrinkle structure.

16. The composite material as claimed in claim 12, having a heat dissipation coefficient greater than that of the metal powder.

17. A composite material, comprising:
    100 parts by weight of polymer powder or liquid; and
    0.5 to 50 parts by weight of graphene flower,
    wherein the graphene flower includes a plurality of graphene sheets arranged in a non-parallel manner and tangled with each other, and
    wherein the graphene flower has a profile free of a planar surface.

18. The composite material as claimed in claim 17, wherein the polymer powder has a diameter of 5 nm to 50 μm.

19. The composite material as claimed in claim 17, wherein the graphene flower gas a diameter of 10 nm to 50 μm.

20. The composite material as claimed in claim 17, wherein the graphene sheets have a curved structure or an irregular wrinkle structure.

21. The composite material as claimed in claim 17, having a heat dissipation coefficient greater than that of the polymer powder or liquid.

* * * * *